US006480943B1

(12) United States Patent
Douglas et al.

(10) Patent No.: US 6,480,943 B1
(45) Date of Patent: Nov. 12, 2002

(54) MEMORY ADDRESS INTERLEAVING AND OFFSET BITS FOR CELL INTERLEAVING OF MEMORY

(75) Inventors: Robert C. Douglas, Santa Clara, CA (US); Kent A. Dickey, Westford, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/563,018

(22) Filed: Apr. 29, 2000

(51) Int. Cl.[7] .............................................. G06F 12/00
(52) U.S. Cl. ...................... 711/157; 711/127; 711/202; 711/209
(58) Field of Search .......................... 711/127, 157, 711/202, 209, 3, 115, 171, 203, 210, 208; 714/8

(56) References Cited

U.S. PATENT DOCUMENTS

| | | | | |
|---|---|---|---|---|
| 4,473,879 A | * | 9/1984 | Zolnowsky et al. | 711/208 |
| 4,488,256 A | * | 12/1984 | Zolnowsky et al. | 711/210 |
| 5,146,571 A | * | 9/1992 | Logan | 714/8 |
| 5,293,607 A | | 3/1994 | Brockman et al. | 711/5 |
| 5,530,837 A | | 6/1996 | Williams et al. | 711/157 |
| 5,630,093 A | * | 5/1997 | Holzhammer et al. | 711/115 |
| 5,721,858 A | * | 2/1998 | White et al. | 711/203 |
| 6,016,535 A | * | 1/2000 | Krantz et al. | 711/171 |
| 6,108,745 A | * | 8/2000 | Gupta et al. | 711/3 |
| 6,233,662 B1 | * | 5/2001 | Prince, Jr. | 711/157 |
| 5,272,594 A1 | * | 8/2001 | Gupta et al. | 711/127 |

* cited by examiner

*Primary Examiner*—David Hudspeth
*Assistant Examiner*—Fred F. Tzeng

(57) ABSTRACT

A method provides for interleaved access of a contiguous logical address space formed by a plurality of memories having respective overlapping address spaces. The memories are organized into memory segments, memory segments of equal size from different memories arranged or organized into interleave groups. An initial largest interleave group is selected and a corresponding first interleave entry is generated in a table. The interleave entry maps a corresponding initial logical address space into each of the memory segments corresponding to the first interleave group. A total memory size included thus far in the table is calculated and successive next larger groups that are integer divisors of the total memory, i.e., the partial sums formed by groups selected thus far. These steps are repeated until all of the contiguous logical address space has been mapped onto the memories. A mask may be used to extract portions from a logical address to index into a table mapping the logical address space onto the memories. Another portion of the logical address includes a memory offset.

20 Claims, 3 Drawing Sheets

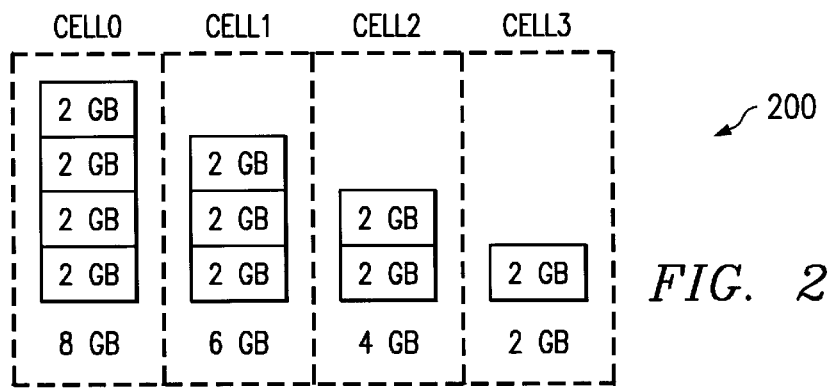
FIG. 2
| 000 | 001 | 010 | 011 | 100 | 101 | 110 | 111 |
|-----|-----|-----|-----|-----|-----|-----|-----|
| 0   | 1   | 2   | 3   | 0   | 1   | 2   | 3   |
| 0   | 1   | 2   | 3   | 4   | 5   | 6   | 7   |
305 → (row 1), 310 → (row 2)
FIG. 3
| 000 | 001 | 010 | 011 | 100 | 101 | 110 | 111 |
|-----|-----|-----|-----|-----|-----|-----|-----|
| 0   | 1   | 2   | 0   | 1   | 2   | 0   | 1   |
| 2   | 0   | 1   | 2   | 0   | 1   | 2   | 0   |
| 1   | 2   | 0   | 1   | 2   | 0   | 1   | 2   |
FIG. 4
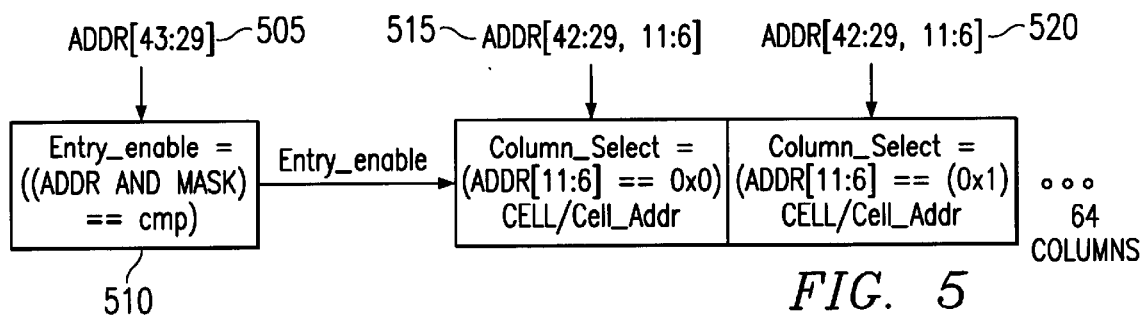
FIG. 5

MEMORY ADDRESS INTERLEAVING AND OFFSET BITS FOR CELL INTERLEAVING OF MEMORY

TECHNICAL FIELD

The invention is directed to a computer system with multiple memory subsystems and more particularly to interleaving access of the subsystems.

BACKGROUND

Historically, main memory was physically situated on a central bus. Within this type of system, memory requests consisting of full physical addresses, were forwarded to the memory subsystem and the data was returned. In a distributed memory system, main memory is physically distributed across many different cells. A cell may consist of a number of processors, an input/output (I/O) device, a cell controller, and memory.

In a distributed system, memory can be noninterleaved or interleaved. Prior art systems of and methods for interleaving memory are described and set forth in, for example, U.S. Pat. No. 5,530,837 issued Jun. 25, 1996 to Williams et al. and U.S. Pat. No. 5,293,607 issued Mar. 8, 1994 to Brockman et al., both patents are assigned to the owner of the present invention, and both of which are incorporated herein by reference in their entireties. In a noninterleaved access method wherein memory is divided into or across multiple physical cells, a unified, contiguous block of memory space is addressed by first sequentially accessing all memory of a first cell followed by sequential access of all memory available in a second cell, etc. If each cell has been configured with its maximum amount of possible memory, the memory will appear, and be addressed as one contiguous memory block to the system. However, if not every cell is configured to its maximum memory capability, this noninterleaved scheme may result in holes within the memory space corresponding to missing memory blocks within the cells. Noninterleaved memory also requires multiple, sequential access to a particular cell since both instructions and data tend to be used sequentially. While a benefit when stored locally, a processor continuously or frequently accessing a remote memory in another cell consumes significant overhead including processing and communications resources at both the local and remote cells and the connecting network(s). When substantially continuous, these resources may become unavailable to other processes and degrade system performance.

Alternatively, the memory within a distributed memory system can be accessed through an interleaving protocol. Interleaving memory across several cells allows for more uniform access to memory. For example, if a system includes two cells of memory which are connected together through a bus system, each cell may include four separate processors. Each cell may also include memory. By interleaving the memory in cell 1 with the memory in cell 2, all eight processors in the system have a more uniformed access to each memory location. Interleaving memory across the two cells also ensures consistency in latency delays for each processor in accessing memory locations. Interleaving memory across the two memory locations also reduces the possibility of bottlenecks when processors attempt to access or retrieve information from memory.

When interleaving is used in a distributed memory system, processors or devices which require access to memory must be able to determine the physical location of the portion of accessible memory.

While systems and methods for interleaving across distributed memory systems are known, their use has included a number of restrictions. For example, some prior distributed systems using interleaving required that the number of cells containing interleaved memory be equal to a power of two. The overall system memory could be contained in two, four, eight, sixteen, etc., different cells. However, problems arose if the overall system memory were contained in a number of cells which were not equal to a power of two. For example, the overall system memory could not be interleaved effectively across seven different cells without difficulty and special processing. Additionally, the amount of memory interleaved in each of the cells also had to be equal to a power of two. So a specific cell location could contain 2, 4, 8 or 16 gigabytes (GB) but not, easily, for example 5 or 13 GB. Also, interleaving across distributed memory cells was easily achievable only when the amount of memory within each cell was equal.

For example, suppose the memory contained within a system is distributed across four cells labeled 0, 1, 2, and 3, respectively. Further suppose each of cell 0 and cell 1 contain 8 GB of memory while cells 2 and 3 each contain 4 GB of memory. The overall system therefore contains 24 GB of memory. The distributed memory could be interleaved as follows. Since each of the four cells contains at least 4 GB of memory, the first interleave entry, entry 0, would contain 4 GB of memory from each of cell 0, 1, 2, and 3 for a total of 16 GB of memory (four from each of the four cells). All of the memory available in cell 2 and cell 3 have now been used in interleave entry 0. Cell 0 and cell 1 each contain four GB of unused memory. Interleave entry 1 would contain the 4 GB of memory from cell 0 and the 4 GB of memory from cell 1. Interleave entry 1 therefore contains 8 GB of memory, four from cell 0 and four from cell 1. The 24 GB of memory in the four cells have now been broken out into two interleave groups. The 24 GB of memory from the four cells can now be viewed as one contiguous block as follows. GB 0 through 15 are located in the lower half of cells 0, 1, 2, and 3, GB 16 through 23 are located in the upper portion of cells 0 and 1. This interleaving occurs at the cache line level. To a processor, the 24 GB of information appears to be one contiguous block. While the 24 GB of information appears to be one contiguous block, physically the 24 GB of information is distributed among four different cells.

In order to successfully access information contained within the memory, a processor would need to determine which cell contains a specific memory address. Prior interleaved distributed memory systems accomplished this through a one-to-one mapping between the logical memory and the physical address. For example, a look up table could be formed which consisted of 24 rows and four columns. The first column would contain the logical GB block, i.e., the most significant address bits representing $2^{30}$ and greater address values which would range from 0 to 23. The second through the fourth columns would contain the physical address of the logical GB blocks within the respective cell. The first 16 rows of this table would identify interleave group 0 i.e., the first 16 GB of memory. Interleave group 1 would start on the 17th row of the table. When a specific processor had to access information stored in memory, the processor could identify the physical location of the memory address from this one-to-one map. These prior art systems have several disadvantages. For example, these methods are inflexible in their mappings so that each segment of physical memory requires a row entry mapping a contiguous portion of logical memory space to that physical location. The system is further inflexible in requiring predetermined, fixed physical block sizes of memory. These limitations result in both overhead requirements and performance issues if the physical memory is non-uniformly distributed over a large number of remote cells, each having its own configuration and distribution of memory resources.

Accordingly, a need exists for a more flexible approach to interleaving memory across the distributed memory system. A need further exists for a memory system and method of configuring and operating memory resources that readily accommodate cell numbers that are not integer powers of 2. Additionally, a need exists for a technique that allows the amount of memory within each cell to be equal to non-powers of 2. A further need exists for a system and method that eliminates the gaps in memory which result from each cell not having its memory configuration maximized so that all cells have equal memory spaces. Further, a need exists which allows a simplified table, or simplified method to determine the physical location of the memory address. A further need exists which will allow the amount of memory in the various cells to be different.

SUMMARY OF THE INVENTION

These and other objects, features and technical advantages are achieved by a system and method which according to one aspect of the invention, an interleaved method provides for accessing a contiguous logical address space formed by a plurality of m memories having respective overlapping address spaces. The memories are organized into memory segments, at least some of which have identical address spaces. The memory segments are arranged or organized into interleave groups such that all segments of an interleave group have completely overlapping address spaces. Thus, all of the segments are addressable by the same address data. However, not all segments having identical address space need be organized into one interleave group. Instead, groups may be formed to facilitate group address boundaries falling on multiples of a next group size. This allows use of the minimum number of address bits to be used to identify a group. An initial largest interleave group is selected and a corresponding first interleave entry is generated in a table. The interleave entry maps a corresponding initial logical address space into each of the memory segments corresponding to the first interleave group. A total memory size included thus far in the table is calculated and a determination is made if this total memory size places the start of any next group on a multiple of that group size. Otherwise, a search is conducted for an interleave group having a size that is evenly divisible into the boundary. These steps are repeated until all of the contiguous logical address space has been mapped onto the memories.

According to a feature of the invention, the interleave entries include designations of ones of the memories corresponding to memory segments constituting respective ones of the interleave groups.

According to another feature of the invention, each of the interleave entries is organized as one or more whole rows of a two dimensional table. The contiguous logical address space is addressable by a multibit address, such that a portion of the multibit address is used to designate a column of the table. A mask is created to use in combination with another portion of the address to designate a row of the table. The column and row data can then be used to access a value stored in the table and select one of the memories.

According to another feature of the invention, the table includes $2^n$ columns and p rows wherein n and p are positive integer values. An $i^{th}$ one of the interleave groups includes $s_i$ memory segments and r rows of the table such that $r=2^n/s_i$ is a positive integer value. Further, each of the interleave groups includes $r=2^n/s_i$ references to each of the memories corresponding to memory segments constituting a respective interleave group.

According to another feature of the invention, at least one of the interleave groups includes a number of memory segments that is not a whole power of two and/or one of the memory segments has an address space that is not a whole power of two.

According to another aspect of the invention, a method maps a contiguous logical address space into a plurality of memories organized into uniform size memory segments. The method includes organizing the memory segments into corresponding interleave groups and generating, for each of the interleave groups, an interleave entry mapping the logical address space into the memories. The interleave entries are ordered based on size except that smaller ones of the interleave entries are used to complete a block size such that they align to multiple integers of the interleaved group size.

According to a feature of the invention, a set of masks are used with binary address data to select one of the interleave entries.

According to another feature of the invention, non-overlapping first and second portions of a memory address are extracted from the address. The first portion is combined with a mask to obtain an interleave entry designator. The second portion is used to select a portion of the interleave entry designating one of the memories. With a particular one of the memories selected, a memory address in the designated memory is accessed based on a remaining portion of the memory address.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 2 shows a block diagram of interleaving across four cells;

FIG. 3 shows a table representing four way and eight way interleaving;

FIG. 4 shows a table depicting three way interleaving;

FIG. 5 shows a block diagram representing sixty four way interleave cell map entry for single cache line interleaving;

DETAILED DESCRIPTION

Figure 1:
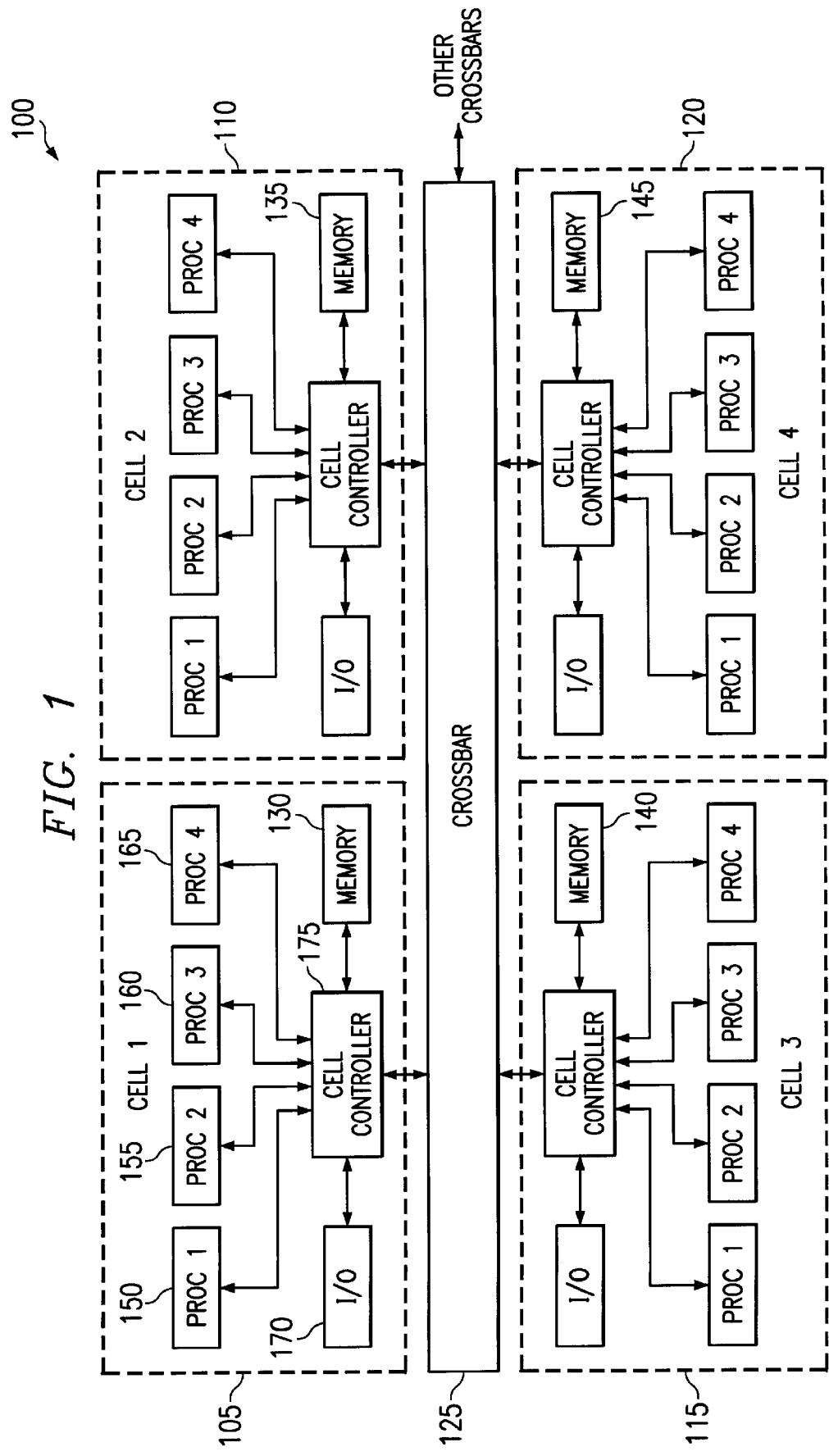
FIG. 1 shows a block diagram of a node including four cells and a crossbar.

Processing system 100 of FIG. 1 includes four cells 105, 110, 115 and 120, connected via crossbar 125. Each cell has a corresponding block of memory, 130 in cell 105; 135 in cell 110; 140 in cell 115 and 145 in cell 120. Although an even number of cells are shown, the present invention allows interleaving between this distributed memory system whether or not the memory address space contained in respective memory locations 130, 135, 140 or 145, is equal to powers of two, and whether or not the total number of cells is equal to an integer power of two.

The distributed memory system 200 of FIG. 2 shows memory distributed over four cells: cell 0, cell 1, cell 2 and cell 3. Cell 0 contains a total of 8 GB of memory; cell 1 contains 6 GB of memory; cell 2 contains 4 GB of memory and cell 3 contains 2 GB of memory. The present invention allows interleaving over these four cells in the following manner. First, an assessment is made as to which cell has the minimum amount of memory available for interleaving. In this case, cell 3 only contains 2 GB of memory. Interleaving entry 0 would therefore interleave 2 GB of memory from cells 0, 1, 2 and 3 for a total of 8 GB of memory. The resultant interleaving entry is shown in FIG. 3 row 305 wherein each row accommodates up to eight segments of memory.

Next, an assessment would be made to determine the minimum amount of memory left in any available cell. In this case, it would be 2 GB in cell 2. In prior systems, interleaving could not be used across cell 0, cell 1 and cell 2 because this represents interleaving over three cells and three is not an integer power of two. However, in the present invention, interleaving can be maintained across cell 0, cell 1 and cell 2 by using three interleaving entries as shown in FIG. 4. Interleaving entry 1 is used for the second GB block of cell 0, interleaving entry 2 for the second 2 GB block out of cell 1 and interleaving entry 3 for the top 2 GB portion of cell 2. At this point, interleaving entry 0 addresses a total of 8 GB of information, while interleaving entry 1, 2 and 3 each contain 2 GB of information. Cell 3's memory resources were completely used in interleaving entry 0 . Cell 2's memory resources were exhausted through the completion of interleaving entry 3.

The next step in this process is to identify the remaining memory left to be allocated in any of the cells. In this case, 2 GB of memory are left in cell 1. Interleaving entry 4 would normally contain 2 GB of memory from cell 0 and 2 GB of memory from cell 1. This arrangement would add 4 GB to the already mapped 14 GB, for a total of 18 GB. However, it is preferable to start each table entry on an integer multiple of the group size, i.e., at 16 GB. Thus, 2 GB needs to be added next to allow the 4 GB in cells 0 and 1 to occupy one interleaving entry. Therefore, interleaving entry 4 represents and maps to the uppermost 2 GB that reside in cell 0. Now the interleaving entries defined thus far (0, 1, 2, 3 and 4) contain 16 GB of memory. Interleaving entry 5 maps to the remaining 2 GB that reside in cell 1 and the remaining 2 GB in Cell 0. This is permissible because the 16 GB allocated so far in entries 0, 1, 2, 3 and 4 is a multiple of 4 GB. In summary, the 20 GB of memory which were contained on cell 0 through cell 3 is now contained in 6 interleaving entries. The first interleaving entry contains 8 GB of information, two from each of the four cells. Interleaving entries 1, 2, 3 and 4 have 2 GB contained within them, and interleaving entry 5 has 4 GB.

An interleaving group is composed of one or more interleaving entries. Interleaving group 0 is composed of the 8 GB which reside within interleaving entry 0, or in other words, 2 GB from each of the four cells. Interleaving group 1 is composed of two GB from cell 0, two from cell 1 and two from cell 2. Interleaving group 2 is composed of the uppermost 2 GB from cell 0. Interleaving group 3 is composed of 2 GB from cell 0 and cell 1, interleaving entries 4 and 5. An interleaving group is defined as a unit of a plurality of cells that have the same amount of memory confined for interleaving in a given memory range.

Referring back to FIG. 1, cell 105 contains four processors 150, 155, 160 and 165, and input/output (I/O) device 170, the cell controller 175 and the previously discussed memory 130. Each of the four processors 150 through 165, and the I/O device 170 require access to the memory 130. The cell controller 175 is the interface between both the processors and the I/O device and the memory 130. In order for a memory accessing device, any of the processors or the I/O device, to access the correct portion of memory, the cell controller must translate the logical memory address known to the memory accessing device into a physical address. The physical address allows the cell controller 175 to know how to route the memory request. Any of the memory accessing devices in cell 1 could also access to cell 115's memory 140, cell 120's memory 145 or cell 110's memory 135. The present invention uses a cell map for the cell controller to translate the memory address contained in the logical memory accessing device into the proper physical address. In a preferred embodiment of this invention, the cell controller would contain a different cell map for each memory accessing device. In FIG. 1, the cell controller 175 would contain five different cell maps, one for each memory accessing device attached.

The cell map contained in a cell controller must allow the memory address to be translated into a physical address which can be used to access the memory. The preferred embodiment of the cell map is a table in which each of the rows correspond to an interleaving group. The present invention includes the capability for 48 interleaving groups. So the corresponding cell map, or table, has 48 rows, one for each of the 48 interleaving groups. In the present invention the table also had 16 columns and one entry which had 64 columns.

Interleaving is most effective when the amount of consecutive memory accessed is kept small. In interleaving cache lines, the cell map must indicate which cells the cache lines are located on. So referring back to interleaving group 0 of FIG. 2, if now the cache lines were interleaving between cells 0, 1, 2 and 3, row 305 of FIG. 3 indicates how the cells would be represented within the table. If bits in the memory address indicated row 00, that would indicate to the cell controller that the physical address for the memory is in cell 0. A memory address of 001 indicates that the physical address of the memory is in cell 1. The eight columns in the table indicate the various 3 bit configurations which, with the use of the table, determine in which cell the physical memory address is located.

To identify the specific cell the physical memory is located in, an interleaving entry is used to identify the row of the cell map and the 4 bit designator is used to indicate the column within the cell map which results in a specific cell map entry. The present invention uses a 44 bit memory address, and bits 9 through 6 are used to indicate the specific column from which the cell map entry is read.

Referring again to FIG. 1, FIG. 1 shows a node with four cells. Each cell has its own memory device. If however, our overall system had two four-celled nodes, there would be eight cells available, each cell with its own memory. If these cells were labeled cell 0 through cell 7, the memory could be interleaved across all eight cells. Row 310 of FIG. 3 shows how memory could be interleaved over all eight cells. In this case, the 3 bit designator from bits 8 through 6 of the memory address would indicate which cell contained the physical address of the memory.

One advantage of the current invention is that it is not limited to cells whose number equals powers of two. If, for instance, we had a 3 cell configuration, the cell map would appear as illustrated in FIG. 4. These three cells would effectively be mapped over three rows in the cell map. Location 0 of the first row would contain a value for cell 0, row 1's location 1 would indicate a value for cell 1, and row 1's location 2 would indicate a pointer to cell 2. This sequence would be repeated until the last cell ended up in the last column of a specific row. For a 3 cell configuration, this would require three rows as shown in FIG. 4. These three interleaving entries still constitute a single interleaving group. However, it should be noted that using a non-power of two number of cells requires the use of additional interleaving entries.

As explained previously, the interleaving group is used to select which row of the cell map the logical memory address resides in. The row is determined through a combination of mask, comparators, and the bits from the memory accessing device. The mask preferably masks out bits of the address that aren't relevant to the determination of the appropriate row. The comparator preferably compares a portion of the address with a standard used to identify which row of the cell map we are interested in.

Referring now to FIG. 5, input address 505 into entry enable block 510 allows the determination of the appropriate row of the cell map through use of bits 43 through 29. Once the row is selected, bits 11 through 6 of entry address 515 are used to determine which column is to be selected within that row of the cell map. Additional table entries can be selected through additional inputs as shown by address input 520. The address input 505 determines the address range and this address range is used to select the row. Once the address range is determined, bits 11 through 6 are used to select the cell map entry which resides within a specific column of the table. Entry enable block 510, uses a mask to discard the least significant bits of the address to determine, with the use of the comparator, the appropriate row.

Figure 6:
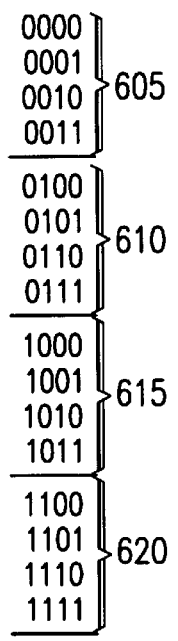
FIG. 6 shows a chart identifying distinguishing characteristics among interleaving groups.

The use of the comparator and the mask in the entry enable 510 of FIG. 5 can be explained with reference to FIG. 6. FIG. 6 shows a binary count of decimal numbers from 0 to 16. The decimal range from 0 to 16 as been broken up into four different sections, Group 605 containing 0 through 3; Group 610 containing 4 through 7; Group 615 containing 8 through 11; and Group 620 containing 12 through 15. In order for the mask to be used efficiently, a way to identify the different groups is necessary. In this case, it can be seen that the first two bits, or the two most significant bits (the two left-most bits) can be used to differentiate between the various groups. The four numbers displayed in Group 605 each start with 00. Alternatively, each of the numbers in 610 start with 01; each in Group 615 start with 10; and each in Group 620 start with 11. A mask is therefore established which consists of 1100. For each bit of interest a "1" is placed for each bit not of interest, or "don't care" a "0" is placed. The comparator is equal to the starting address of the memory block. The mask is used decide which of the four groups, 605 through 620, the sequence of bits resides. A comparison between the two most significant bits will determine a specific row within the cell map.

Figure 7:
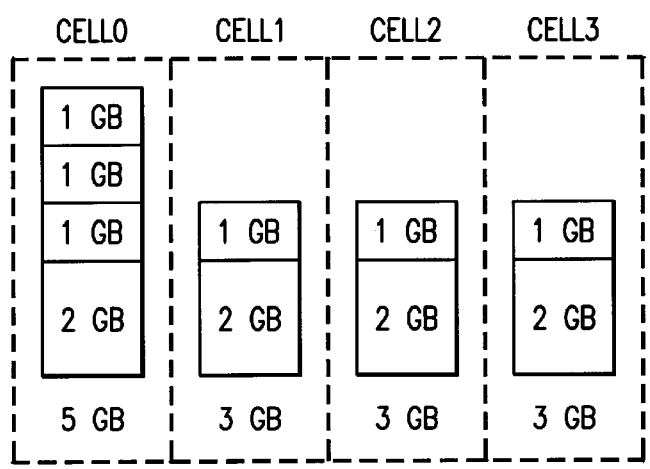
FIG. 7 shows a block diagram of interleaving across cells containing non power of twos memory amounts.

To further illustrate the use of the comparator and the mask, several examples will be examined. Referring to FIG. 7, a node contains four cells, where cell 0 has 5 GB, cell 1 has 3 GB, cell 2 has 3 GB, and cell 3 has 3 GB of memory. In hexadecimal notation, 1 GB equals $0X000_{13}$ 40000000. Interleaving entry 0 of FIG. 7 would contain 2 GB from each of the four cells for a total of 8 GB of memory. This memory block would go from 0 GB up to 8 GB. The comparator would be equal to 0X000__00000000. The value for the mask would be determined by identifying the bits which need to be examined to decide if the memory location is greater than 8 GB. In each bit position which must be examined to decide if the value is over 8 GB, a "1" would be placed. So in hexadecimal notation, the mask would be equal to 0Xffe__00000000. Since the eight least significant bits in the hexadecimal notation is not necessary to determine whether the value of the memory location is over 8 GB. They do not need to be examined. The mask therefore only contains the bit positions which need to be examined to decide if the memory value from one of the memory accessing devices is over 8 GB or not. With this mask comparator established, any access in the range of 0 to 8 GB will activate only interleaving entry 0. Within the appropriate row of the corresponding cell map, the cell numbers may be identified as 0, 1, 2, 3, 0, 1, 2, 3. This is similar to row 305 in FIG. 3. This configuration would achieve a four-way interleaving between cells 0 through 3. For interleaving entry 1, again all four cells are used, but this time only 1 GB of memory from each cell. In this case, the comparator value is equal to 0X002__00000000 which is equivalent to 8 GB. This is the starting value for this interleaving entry. The mask value in this case is 0Xfff__00000000. Once interleaving entry 1 has been established, 2 GB remain in cell 0.

In general, interleaving is performed over the largest blocks first and then subsequent interleave blocks must be smaller in size. The 2 GB remaining in cell 0 would normally be broken up into 1 GB chunks as shown in FIG. 7. However, in this case, the 12 GB contained in interleaving entry 0 and interleaving entry 1 is divisible by the 2 GB remaining in cell 0. Therefore, interleaving entry 2 will contain the 2 GB of memory left in cell 0 and the comparator value will be 0X003__00000000, which is 12 GB and the mask value will be 0Xfff__80000000.

Figure 8:
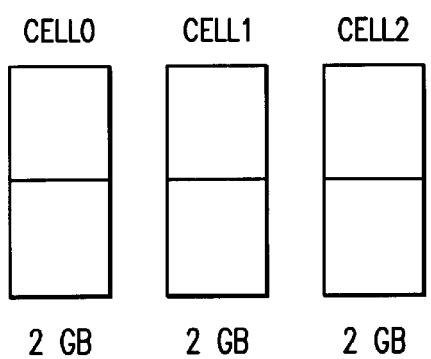
FIG. 8 shows a block diagram of interleaving across a non power of two number of cells.

As a final example, if the node contained three cells, each which contained 2 GB of memory, our interleaving would be performed differently. Referring now to FIG. 8, the present invention does support odd number cell interleaving. For interleaving entry 0, the comparator would be 0X000__00000000, or 0 GB. The mask would be 0Xfff__80000000. This allows interleaving between the first GB of cell 0 and the first GB of cell 1. The row entry for this case would consist of 0 followed by 1 through the length of the row. This interleaves two ways over the first 2 GB of memory, again, 1 GB from cell 0 and 1 GB from cell 1.

For interleaving entry 1, the comparator value would be 0X000__80000000, or equal to 2 GB. The mask value for this would be 0Xfff__80000000. The corresponding cell map row would be alternating 1s and 2s which allows interleaving two ways over the second GB from cell 1 and the first GB from cell 2.

Interleaving entry 2 has a comparator value of 0X001__00000000, which is equal to 4 GB. The mask value is 0Xfff__80000000. The corresponding row within the cell map for this interleaving entry is 2 0 2 0 2 0 etc. throughout the length of the row. This interleaving entry interleaves 2 ways over cells 2 and 0 and contain the last 2 GB of memory.

In the preferred embodiment of the invention, the cell controller acquires more information from the cell map entry than just the cell ID. For instance, there could be several cell map entries which direct the cell controller to cell 0. The memory contained in cell 0 may have been broken out among various interleaving groups of interleaving entries. The cell map entry must also supply the cell controller with an indication where within cell O's memory the information required is stored. A CELL_ADDR, or cell address, is used which directs the cell controller to a specific 512 MB region within a cell memory for specific memory access. The equation for this is then:

CELL_ADDR=((ADDR [42:29] & CHUNK_MASK)>>interleave+CHUNK_START

The CELL_ADDR, as shown in FIG. 5, uses address bits 29 through 42 in its determination of where to start reading data from the specific cell. The CHUNK_MASK contained in the equation is the inverse of the mask previously discussed. The purpose of the CHUNK_MASK is to direct the cell controller to the right portion of this block of memory to recall the desired memory. Additionally, the CELL_ADDR is right shifted to eliminate the bits which have been used for interleaving previously from further consideration. If our table had contained eight columns, three interleaving bits would have been required to identify which of the eight columns the map cell entry resided within. If the cell map had 16 columns, four bits would be required for the interleaving value. CHUNK_START is the amount of memory which had been dedicated or previously used by other interleaving entries or interleaving groups. For example, referring back to interleaving entry 2 of FIG. 2, interleaving entry 1 came after interleaving entry 0 had occupied 2 GB from each of the four cells. Therefore, if we are addressing the second 2 GB portion of cell 0, the CHUNK_START would be the 2 GB which were contained in interleaving entry 0. Alternatively, still referring to FIG. 2, interleaving entry 5 which contained 2 GB in cell 0 and 2 GB in cell 1, had a CHUNK_START of 4 GB in both cell 0 and cell 1. The CELL_ADDR equation fundamentally uses the address bits from the memory accessing device, adds an amount of memory equal to the offset to arrive at the specific memory location within a given block, right shifts to eliminate bits which have already been using interleaving and are no longer necessary to determine the location within the block and then adds cell memory which has been dedicated to interleaving within other interleaving entries or interleaving groups.

In the preferred embodiment of this invention, the CELL_ADDR equation is not implemented through a hardware add. Due to the inefficiency of hardware adds, a hardware OR is used to effectuate an add. For example, if we were to add a decimal 4 to a decimal 2 in binary, we would add a 1 0 0 to a 0 1 0. If we ORed 1 0 0 with 0 1 0, the result would be 1 1 0, which is equivalent to a decimal 6. The OR performs the same function as a hardware ad.

In the preferred embodiment of this invention, the interleaving between cells occurs first with larger blocks of memory, and later with smaller blocks of memory. Referring again to FIG. 2, interleaving entry 0 contained 8 GB of memory, split between cells 0, 1, 2 and 3. Interleaving entry 1 contained 2 GB of memory in cell 0. If instead interleaving entry 1 had contained 1 GB of memory, the larger block of memory dedicated to interleaving entry 0 should be addressed before the smaller block dedicated to interleaving entry 1.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An interleaved method of accessing, as a contiguous logical address space, a plurality of m memories organized into memory segments, the method comprising the steps of:
    i) organizing ones of said memory segments of equal size from different ones of said memories into corresponding interleave groups, wherein the memory segments are distributed over multiple memory banks located within multiple memory cells, wherein the multiple cells are part of a distributed memory system;
    ii) selecting a first of said interleave groups having a largest total memory size;
    iii) generating a first interleave entry in a table mapping an initial logical address space into each of said memory segments corresponding to said first interleave group;
    iv) determining a total memory size value based on said first interleave group;
    v) selecting a next largest memory group such that said total memory value is an integer multiple thereof;
    vi) generating a next interleave entry in said table mapping a next logical address space into each of said memory segments corresponding to said next interleave group;
    vii) updating said total memory size value; and
    viii) repeating steps v through vii until all of said contiguous logical address space has been mapped onto said memories.

2. The method according to claim 1 wherein said interleave entries include designations of ones of said memories corresponding to memory segments constituting respective ones of said interleave groups.

3. The method according to claim 1 wherein each of said interleave entries is organized as one or more whole rows of a two dimensional table.

4. The method according to claim 3 wherein the contiguous logical address space is addressable by a multibit address, the method including a step of using a portion of said multibit address to designate a column of said table.

5. The method according to claim 4 further comprising steps of:
    generating a mask to extract another portion of said multibit address;
    using said mask in combination with said multibit address to designate a row of said table.

6. The method according to claim 5 further comprising a step of using a value stored in said table at a designated column and row to select one of said memories.

7. The method according to claim 3 wherein said table includes $2^n$ columns and p rows wherein n and p are positive integer values.

8. The method according to claim 7 wherein an $i^{th}$ one of said interleave groups includes $s_i$ memory segments and r rows of said table such that $r \times 2^n/s_i$ is a positive integer value.

9. The method according to claim 8 wherein each of said interleave groups includes $r \times 2^n/s_i$ references to each of said memories.

10. The method according to claim 1 wherein at least one of said interleave groups includes a number of memory segments that is not a whole power of two.

11. The method according to claim 1 wherein at least one of said memory segments has an address space that is not a whole power of two.

12. The method according to claim 1 wherein each of said memories is organized into a plurality of said memory segments, each memory segment assigned an offset within the respective memory, the offset derived by organizing said memory segments by aligning the memory segment size to a respective memory segment offset location.

13. A method of mapping a contiguous logical address space into a plurality of memories organized into uniform size memory segments, the method comprising the steps of:

organizing ones of said memory segments into corresponding interleave groups; and generating, for each of said interleave groups, an interleave entry mapping the logical address space into said memories, said interleave entries ordered based on alignment of sizes within the address space.

14. The method according to claim 13 further comprising a step of generating a set of masks for use with binary address data so as to select one of said interleave entries.

15. The method according to claim 14 wherein said remaining portion of said memory address includes a memory offset.

16. The method according to claim 13 further comprising the steps of:

extracting non-overlapping first and second portions of a memory address;

masking said first portion of said memory address to obtain an interleave entry designator;

selecting, using said second portion of said memory address, a portion of said interleave entry designating one of said memories; and accessing a memory address in the designated memory based on a remaining portion of said memory address.

17. A system for mapping a contiguous logical address space into a plurality of memories organized into uniform size memory segments, said system comprising:

means for organizing ones of said memory segments into corresponding interleave groups, wherein the uniform size memory segments are distributed over multiple memory banks located within multiple memory cells, wherein the multiple cells are part of a distributed memory system; and means for generating, for each of said interleave groups, an interleave entry mapping the logical address space into said memories, said interleave entries ordered based on alignment of sizes within the address space.

18. The system according to claim 17 further comprising means for generating a set of masks for use with binary address data so as to select one of said interleave entries.

19. The system according to claim 18 wherein said remaining portion of said memory address includes a memory offset.

20. The system according to claim 17 further comprising:

means for extracting non-overlapping first and second portions of a memory address;

means for masking said first portion of said memory address to obtain an interleave entry designator;

means for selecting, using said second portion of said memory address, a portion of said interleave entry designating one of said memories; and means for accessing a memory address in the designated memory based on a remaining portion of said memory address.

* * * * *